United States Patent Office 2,942,294
Patented June 28, 1960

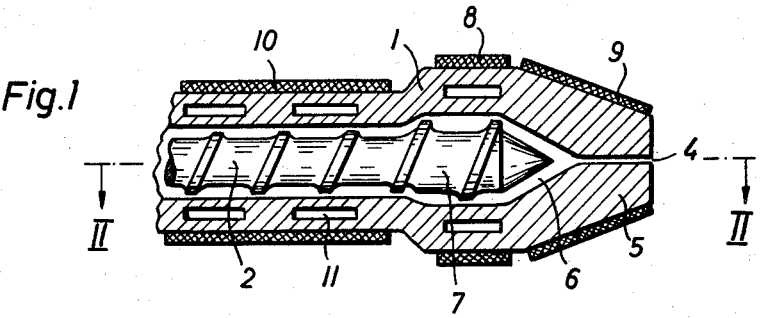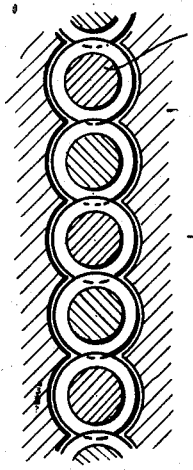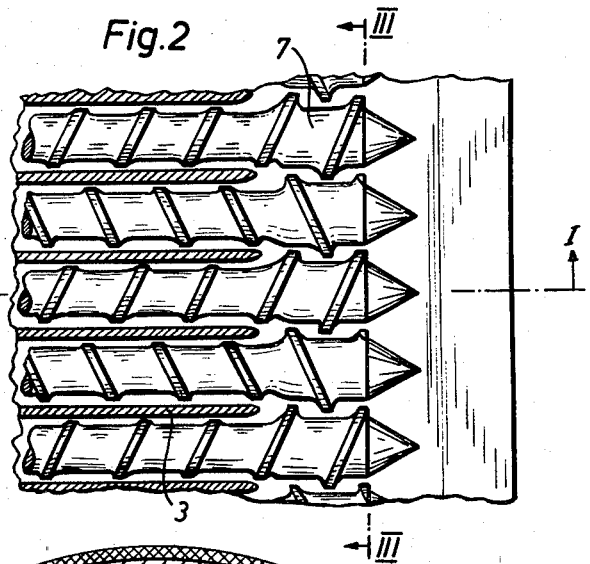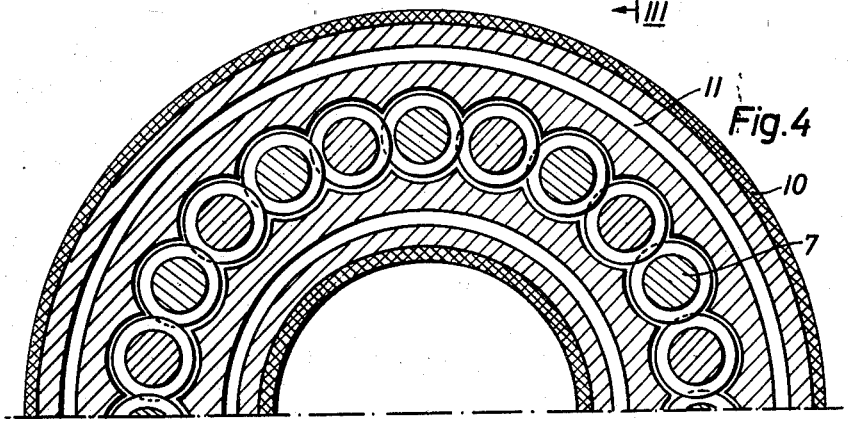

2,942,294

EXTRUSION PRESS FOR PRODUCTION OF SHEET-LIKE OR TUBULAR STRUCTURES FROM THERMOPLASTIC SYNTHETIC COMPOSITIONS

Hans Reifenhäuser, Troisdorf-Cologne, Germany, assignor to Reifenhäuser K.G., Troisdorf-Cologne, Germany Filed July 8, 1957, Ser. No. 670,490

Claims priority, application Germany July 21, 1956

5 Claims. (Cl. 18—12)

The present invention is concerned with an extrusion press for production of sheet-like or tubular structures from thermoplastic synthetic compositions; and more particularly with an extrusion press for such purpose comprised of several screw or worm presses disposed next to each other in a plane or in a closed curve or circle which feed into a common chamber connected to the screw or worm enclosing cylinders, the outlet or mouth structure of which chamber preferably is in the form of a wide slit nozzle or ring nozzle.

For the purpose of producing sheets from thermoplastic synthetic materials, it has already been proposed that in an extrusion press several worms or spirals rotating in the same sense should be so disposed in a common housing that the adjacent worms or spirals be in mesh with one another, and the material should be conveyed from the charging side to a slit disposed on the discharge side, the length of the slit corresponding to the width of the worm enclosing housing.

Moreover there is known a slit press for the production of films or the like from thermoplastic synthetic materials, wherein two or more worm presses, separated from one another by partitions are disposed adjacently; and slit-like outlet openings of the presses empty into a common blending and pressure-equalizing chamber (which chamber may be heated if necessary) provided with a slit-like mouthpiece extending over its entire width, from which the thermoplastic synthetic material discharges as a sheet-like or tubular product. This chamber in which the material can be additionally heated and in which a pressure equalization takes place, makes possible the production of very wide sheets of slight thickness.

It has now been found that this object can also be advantageously attained with an extrusion press of such character having several worm presses disposed next to each other in a plane or in a circle and emptying into a common chamber joined to the worm cylinders whose exhaust side is constructed in the form of an extended slit or ring-nozzle, by carrying the worm spirals or threads beyond the worm cylinders into this chamber and in this chamber region enlarging the diameter of the worm spirals to such degree that the adjacent worm spirals or threads are engaged in each other.

These elongated and enlarged heads at the discharge side of the press produce not only an improved kneading and blending and a consequent excellent homogenization of the plasticized materials; but also a uniform advancement of the same in the direction of the common slit nozzle which is appended immediately behind the heads of the worms. Hence is obviated all need of a special forechamber for equalization of the pressure and temperature of the material emerging from the cylinders. The advantages of this arrangement appear whether the worms are rotating in the same or opposite sense.

One object of the present invention is then the provision of an extrusion press for the production of continuous tubular or sheet forms of thermoplastic materials, which is of simple construction, yet adapted to effect an improved mixing or blending of the material feed into the press for extrusion.

A further object is the provision, in a press of the character described, of means effecting a uniform advancement of the material to be extruded from the loading side to the discharge nozzle so that material is extruded at a substantially uniform linear rate over the transverse extent of the nozzle.

A still further object is to obviate need for a special pressure equalizing and blending chamber between the extrusion die nozzle and the several worm or spiral material advancing devices in analogous presses of the prior art.

Still other objects and advantages will appear from the following description and the drawings, wherein—

Fig. 1 is a fragmentary longitudinal section taken through one of the adjacent worm presses in an extrusion press embodying the invention;

Fig. 2 is a cross section through the extrusion press with several worms of which only five are shown;

Fig. 3 is a cross section taken as indicated by the line 3—3 in Fig. 2; and

Fig. 4 is a cross section through an extrusion press in which the worms are disposed in circular fashion.

In the drawings, there is shown only that portion of an extrusion press, for extruding synthetic thermoplastic compositions into continuous sheet or tubular form, to which the present invention is directly pertinent.

The structure disclosed in Figs. 1–3 is specifically adapted to producing a sheet or film form. In a common housing 1 there are disposed several worm spindles 2, of which only five are shown in full in the drawing, separated from one another by the cylinder walls 3. Between the outlet regions of the worm cylinders and the common discharge slit 4 of the extrusion die or nozzle 5, there is provided a space 6 extending across the entire span of the adjacent worm cylinders, into which space the elongated heads 7 of the individual worms 2 project. In the space 6 immediately before the entrance to the nozzle, the enlargements or heads of the worm elements have such increased core and thread diameters that the adjacent threads or spirals are in mesh with one another. The ends of the enlargements are conical or tapered to correspond with the lead-in taper of the nozzle. The housing in the region of the worm cylinders is provided in known manner with electric heating elements 8, 9 and 10 applied to the exterior thereof, and with cooling channels 11.

In the arrangement of Fig. 4 the worm structures are disposed next to one another along a closed curve or circular locus. With this arrangement therefore with application of a greater number of smaller worms and a corresponding ring formed slit nozzle disposed before the same, hollow objects can be produced endlessly and continuously, as for example tubes of very great dimensions.

A developed section taken circumferentially of Fig. 4 through the axes of the worms and a radial section through the axis of one of the worms, would of course be quite similar respectively to Fig. 2 and Fig. 1.

The tubular form produced by the arrangement of Fig. 4 could of course be other than circular by disposing the worms along a corresponding closed curve shape and using a correspondingly shaped nozzle.

I claim:

1. In an extrusion press for the production of longitudinally continuous bodies of synthetic plastic material of thin gauge and extended dimension transverse to the length thereof, having a plurality of worm presses disposed next to one another, and discharging endwise into a common chamber appended to cylinders respectively circumferentially enclosing the worms, said chamber having its outlet side formed as an extended slit type nozzle, that improvement comprising: each worm spindle and its worm spiral elongated beyond the corresponding cylinder out into said chamber, and each worm in the chamber region being enlarged in core and spiral diameter to such degree that the spirals of adjacent worms are in mesh with one another up to the very entrance of the nozzle for thoroughly working the plastic material immediately before introduction to the nozzle.

2. An extrusion press for production of extended continuous bodies of synthetic thermoplastic material of thin gauge and of relatively great width comprising: a housing having a series of similar parallel separated cylindrical bores successively adjacent to each other, an extrusion die nozzle with a slit-like opening extending over the transverse span of said series, said housing having a continuous chamber disposed between the ends of said cylinders and said nozzle into which chamber the cylinders and nozzle open, a corresponding series of rotatable threaded worm elements one in each of said cylinders for conveying thermoplastic material from inlet ends of the cylinders through said space and extruding the same from said slit, each said element having a diametrically enlarged portion projecting into said chamber, the worm thread being carried out onto the enlarged portion up to the entrance region of the nozzle, the enlargement being such that the threads of adjacent enlarged portions interengage with each other for thoroughly working the plastic material immediately before introduction to the nozzle whereby a uniformly plastic and homogeneous material is delivered to the nozzle.

3. An extrusion press as set forth in claim 2, wherein the series of cylinders and worm elements have axes lying substantially in one plane, and the nozzle is provided with a substantially straight slit for extrusion of a continuous sheet product.

4. An extrusion press as set forth in claim 2 wherein the series of cylinders and worm elements have axes arranged to intersect a closed curve and the nozzle is provided with a correspondingly curved slit for extrusion of a continuous tubular product.

5. An extrusion press as set forth in claim 4 wherein said series is circularly arranged.

References Cited in the file of this patent

UNITED STATES PATENTS

| | | |
|---|---|---|
| 2,563,396 | Colombo | Aug. 7, 1951 |
| 2,588,196 | Barbieri | Mar. 4, 1952 |
| 2,693,348 | Ellermann | Nov. 2, 1959 |

FOREIGN PATENTS

| | | |
|---|---|---|
| 956,605 | France | Feb. 3, 1950 |
| 915,689 | Germany | July 26, 1954 |